(12) United States Patent
Rose et al.

(10) Patent No.: US 11,661,115 B2
(45) Date of Patent: May 30, 2023

(54) BODY STRUCTURE FOR AN ELECTRICALLY OPERATED VEHICLE

(71) Applicant: Volkswagen Aktiengesellschaft, Wolfsburg (DE)

(72) Inventors: Stephan Rose, Wasbuettel (DE); Werner Krauth, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/584,112

(22) Filed: Jan. 25, 2022

(65) Prior Publication Data
US 2022/0144347 A1 May 12, 2022

Related U.S. Application Data

(63) Continuation of application No. PCT/EP2020/066019, filed on Jun. 10, 2020.

(30) Foreign Application Priority Data

Jul. 25, 2019 (DE) ...................... 10 2019 211 103.3

(51) Int. Cl.
*B62D 25/20* (2006.01)
*B60K 1/04* (2019.01)
(Continued)

(52) U.S. Cl.
CPC ............ *B62D 25/2018* (2013.01); *B60K 1/04* (2013.01); *B62D 25/025* (2013.01); *B62D 25/04* (2013.01);
(Continued)

(58) Field of Classification Search
CPC .. B62D 25/08; B62D 25/025; B62D 25/2036; B62D 27/023; B62D 21/15; B62D 21/152; B60K 2001/0438
(Continued)

(56) References Cited

U.S. PATENT DOCUMENTS 4,618,163 A 10/1986 Hasler et al.
5,112,102 A 5/1992 Wurl
(Continued)

FOREIGN PATENT DOCUMENTS

CH 293838 A 10/1953
DE 4013784 A1 11/1991
(Continued)

OTHER PUBLICATIONS

International Search Report dated Sep. 30, 2020 in corresponding application PCT/EP2020/066019.

*Primary Examiner* — Dennis H Pedder
(74) *Attorney, Agent, or Firm* — Muncy, Geissler, Olds & Lowe, P.C.

(57) ABSTRACT

A body structure for an electrically operated vehicle, having an installation space for a traction battery, which space is open toward the vehicle bottom in the vertical vehicle direction, is delimited toward the vehicle top by a floor pan part that forms the vehicle floor, and is delimited on both sides in the transverse vehicle direction by a rocker panel that delimits a side-door opening toward the vehicle bottom, wherein a front body longitudinal member that transitions into the respective rocker panel toward the rear of the vehicle in the longitudinal vehicle direction extends on each vehicle side in the front-end region, and wherein the relevant front corner of the traction battery is enclosed by an interior corner region, in particular right-angled interior corner region, that stretches between the rocker panel and the front battery cross member.

10 Claims, 10 Drawing Sheets

(51) Int. Cl.
  *B62D 25/02* (2006.01)
  *B62D 25/04* (2006.01)

(52) U.S. Cl.
  CPC .. *B62D 25/2036* (2013.01); *B60K 2001/0438* (2013.01)

(58) Field of Classification Search
  USPC ... 296/204, 203.01, 2, 29, 30, 187.09, 187.1
  See application file for complete search history.

(56) References Cited

U.S. PATENT DOCUMENTS

| | | | |
|---|---|---|---|
| 7,469,957 | B1 | 12/2008 | Boettcher |
| 8,424,960 | B2* | 4/2013 | Rawlinson ........... B62D 21/152 |
| | | | 296/203.02 |
| 9,296,426 | B2* | 3/2016 | Delord .................. B62D 21/18 |
| 9,579,963 | B2 | 2/2017 | Landgraf |
| 10,279,693 | B2* | 5/2019 | Shimizu .................. B60L 50/66 |
| 10,300,948 | B2* | 5/2019 | Ashraf .................... B62D 21/07 |
| 10,370,035 | B2* | 8/2019 | Fees .......................... B60K 1/00 |
| 10,494,026 | B2* | 12/2019 | Takahashi .......... B62D 25/2036 |
| 2009/0146462 | A1 | 6/2009 | Sato et al. |
| 2013/0088044 | A1 | 4/2013 | Charbonneau et al. |
| 2014/0338999 | A1 | 11/2014 | Fujii et al. |
| 2015/0166107 | A1 | 6/2015 | Delord et al. |

FOREIGN PATENT DOCUMENTS

| | | |
|---|---|---|
| DE | 4204826 A1 | 6/1993 |
| DE | 19506160 A1 | 8/1996 |
| DE | 19963068 A1 | 6/2001 |
| DE | 102011100323 A1 | 11/2012 |
| DE | 102011100624 A1 | 11/2012 |
| DE | 102013015531 A1 | 7/2014 |
| EP | 0146716 A2 | 7/1985 |
| WO | WO2015113579 A1 | 8/2015 |

* cited by examiner

BODY STRUCTURE FOR AN ELECTRICALLY OPERATED VEHICLE

This nonprovisional application is a continuation of International Application No. PCT/EP2020/066019, which was filed on Jun. 10, 2020, and which claims priority to German Patent Application No. 10 2019 211 103.3, which was filed in Germany on Jul. 25, 2019, and which are both herein incorporated by reference.

BACKGROUND OF THE INVENTION

Field of the Invention

The present invention relates to a body structure for an electrically operated vehicle.

Description of the Background Art

In the case of an electrically operated, two-track vehicle, a rectangular traction battery can be inserted from below the vehicle into an installation space that is open at the bottom. The battery installation space can be delimited in the longitudinal direction of the vehicle by front and rear battery cross members and be delimited in the transverse direction of the vehicle by lateral rocker panels, which connect the front/rear battery cross members to one another. The traction battery can have a circumferential housing flange on its battery housing. When the traction battery is inserted in the installation space on the body side, the battery housing flange is screwed to the underside of the rocker panels and to the underside of the front/rear battery cross members.

In a generic body structure, a front body longitudinal member that transitions into the respective rocker panel toward the rear of the vehicle in the longitudinal vehicle direction is arranged on each vehicle side in the front-end region. The relevant front corner of the traction battery is enclosed by a right-angled interior corner region that stretches between the rocker panel and the front battery cross member.

With regard to a body structure as a rigid assembly in the event of a frontal crash, in the prior art the front body longitudinal member and the rocker panel that adjoins it toward the rear of the vehicle can extend in longitudinal alignment. In the event of a frontal crash, this results in a crash-favorable transmission of force from the vehicle front end to the vehicle rear end facing away from the crash, specifically while relieving force on the crash-sensitive traction battery to a great extent. However, in this case the traction battery has comparatively narrow dimensions in the transverse vehicle direction, with commensurately reduced battery capacity.

From DE 10 2013 015 531 A1, a motor vehicle bodyshell is known as well as a manufacturing method for such a bodyshell. A vehicle with built-in traction battery is known from DE 10 2011 100 624 A1.

SUMMARY OF THE INVENTION

It is therefore an object of the present invention to provide a body structure for an electrically operated vehicle in which crash safety is provided in the event of a frontal crash on the one hand, and on the other hand the battery capacity of the crash-sensitive traction battery is increased in comparison with the prior art.

According to an exemplary embodiment of the invention, the rocker panel and the front body longitudinal member adjoining it are no longer oriented in longitudinal alignment with one another. Instead, the rocker panel is offset toward the exterior of the vehicle with respect to the front body longitudinal member by a lateral offset in the transverse direction of the vehicle. In this way, installation space for the traction battery is gained in the transverse vehicle direction as compared to the prior art. The traction battery can thus have substantially wider dimensions, by which means its battery capacity is increased. In order to provide crash safety in the event of a frontal crash, a front corner joint produced as a hollow profile adjoins the front body longitudinal member toward the rear of the vehicle in the longitudinal vehicle direction. The front hollow profile corner joint is widened toward the rear of the vehicle, taking up the lateral offset, and is connected to the rocker panel in a force-transmitting manner at a rocker panel connecting point. In this way, the impact force in the event of a frontal crash can be transmitted in the direction of the vehicle rear end while relieving the traction battery of force.

The front body longitudinal member can be a hollow profile part that is closed in cross-section, specifically with a longitudinal member floor, a longitudinal member top wall, and with inner and outer side walls. These side walls connect the longitudinal member floor to the longitudinal member top wall. The hollow profile corner joint can also be designed in the same manner: The hollow profile corner joint can be a hollow profile part that is closed in cross-section, the corner joint floor of which lengthens the longitudinal member floor toward the rear of the vehicle. Similarly, corner joint side walls can lengthen the longitudinal member side walls toward the rear of the vehicle. In addition, a corner joint top wall can lengthen the longitudinal member top wall toward the rear of the vehicle. In this case, the cavity of the hollow profile corner joint, which is open toward the rear of the vehicle, can be closed by a transverse partition part of the front battery cross member.

In common practice, the two front body longitudinal members extend in an upper longitudinal member plane, while the rocker panels as well as the traction battery located between them are positioned in a lower vehicle plane. Against this background, the corner joint floor can be divided into a vehicle rear and lower floor segment, onto which the traction battery can be screwed from below the vehicle, and a vehicle front and upper floor segment, which is connected to the longitudinal member floor. The two floor segments of the corner joint floor, which are offset vertically relative to one another, can transition into one another through a center segment that extends obliquely downward toward the rear of the vehicle.

With regard to proper installation of supply lines from the front-end region to the traction battery, it is preferred when the two hollow profile corner joints are not connected by a battery cross member that extends continuously in the transverse vehicle direction, but instead the two front hollow profile corner joints are separated from one another in the transverse vehicle direction by a window-like supply access. Various supply lines can be routed to the traction battery through the supply access.

In order to nevertheless provide sufficient assembly rigidity in the transverse vehicle direction, it is preferred when the corner joint top wall of each hollow profile corner joint is part of a footwell cross member panel that extends continuously without interruption in the transverse vehicle direction. The footwell cross member panel delimits the passenger compartment footwell toward the front of the vehicle. In addition, the footwell cross member panel can bridge the window-like supply access at the top, while the supply access remains open toward the vehicle bottom.

In the event of a frontal crash, a battery load path is formed that incorporates the front body longitudinal member, the corner joint floor acting as a shear panel, and the transverse partition part of the battery cross member. In order to reinforce the battery load path, a partition part can be provided in the cavity of the hollow profile corner joint. The partition part can be positioned approximately in longitudinal alignment with the front longitudinal member and be connected to the corner joint floor and to the corner joint top wall via attachment points (weld points).

In addition, in the event of a frontal crash, a rocker panel load path parallel to the battery load path can be formed that incorporates the front body longitudinal member, the corner joint floor acting as a shear panel, the corner joint outer side wall, and the rocker panel. In order to reinforce the rocker panel load path, it is preferred when a reinforcing panel is arranged in the cavity of the hollow profile corner joint. The reinforcing panel can be connected to the corner joint floor, to the transverse partition part of the battery cross member, and to the corner joint outer side wall in a force-transmitting manner (for example via weld points) while forming a hollow member. Moreover, with regard to proper transmission of force, the reinforcing panel can remain free of connection relative to the corner joint top wall.

The hollow profile corner joint can be connected in a force-transmitting manner directly to the rocker panel toward the rear of the vehicle at the rocker panel connecting point. A structurally simple implementation of the rocker panel connecting point as a rigid assembly is explained below: In this way, the vehicle rear and lower floor segment of the corner joint floor can be lengthened toward the exterior of the vehicle in the transverse vehicle direction with a joining section. The joining section of the vehicle rear/lower floor segment engages under a rocker panel underside and is connected to it (through a weld joint, for example). Both the vehicle rear/lower floor segment and the vehicle front/upper floor segment are planar and horizontal in design, whereas the interposed center segment extends in an oblique position between the two floor segments.

In addition, in order to realize the rocker panel connecting point, the corner joint outer side wall can be lengthened toward the exterior of the vehicle in the transverse vehicle direction with a rocker panel end piece. The rocker panel can terminate in a force-transmitting manner toward the front of the vehicle at the rocker panel end piece of the corner joint outer side wall.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
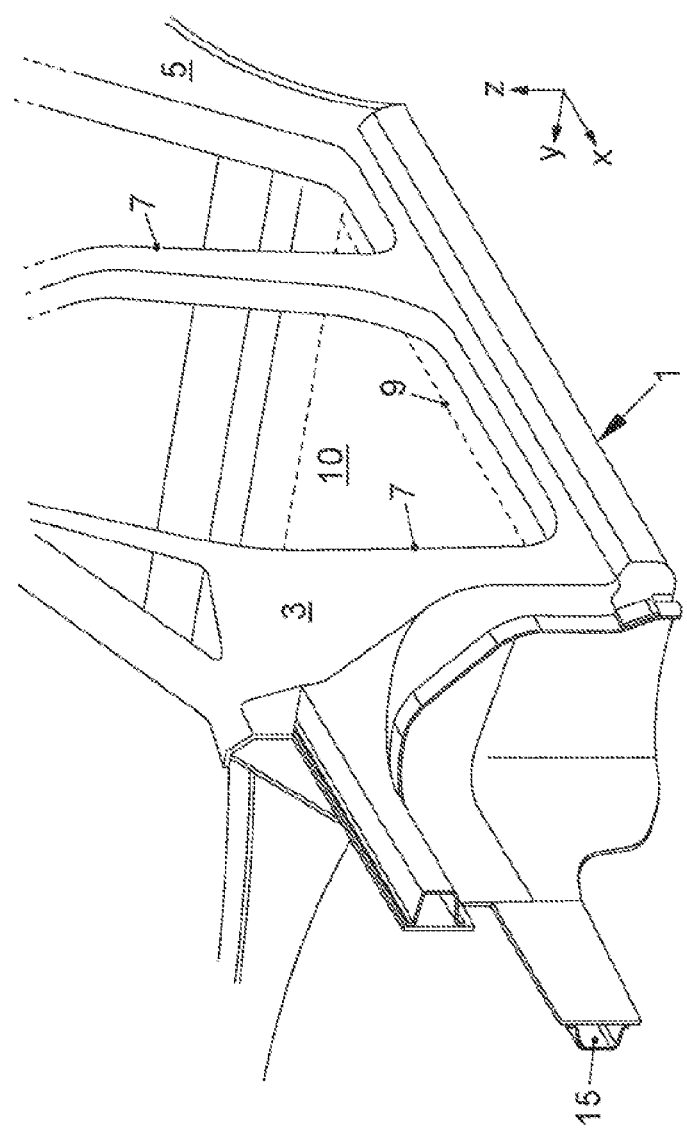
FIG. 1 shows a body structure of a two-track motor vehicle in a perspective partial view.
Figure 2:
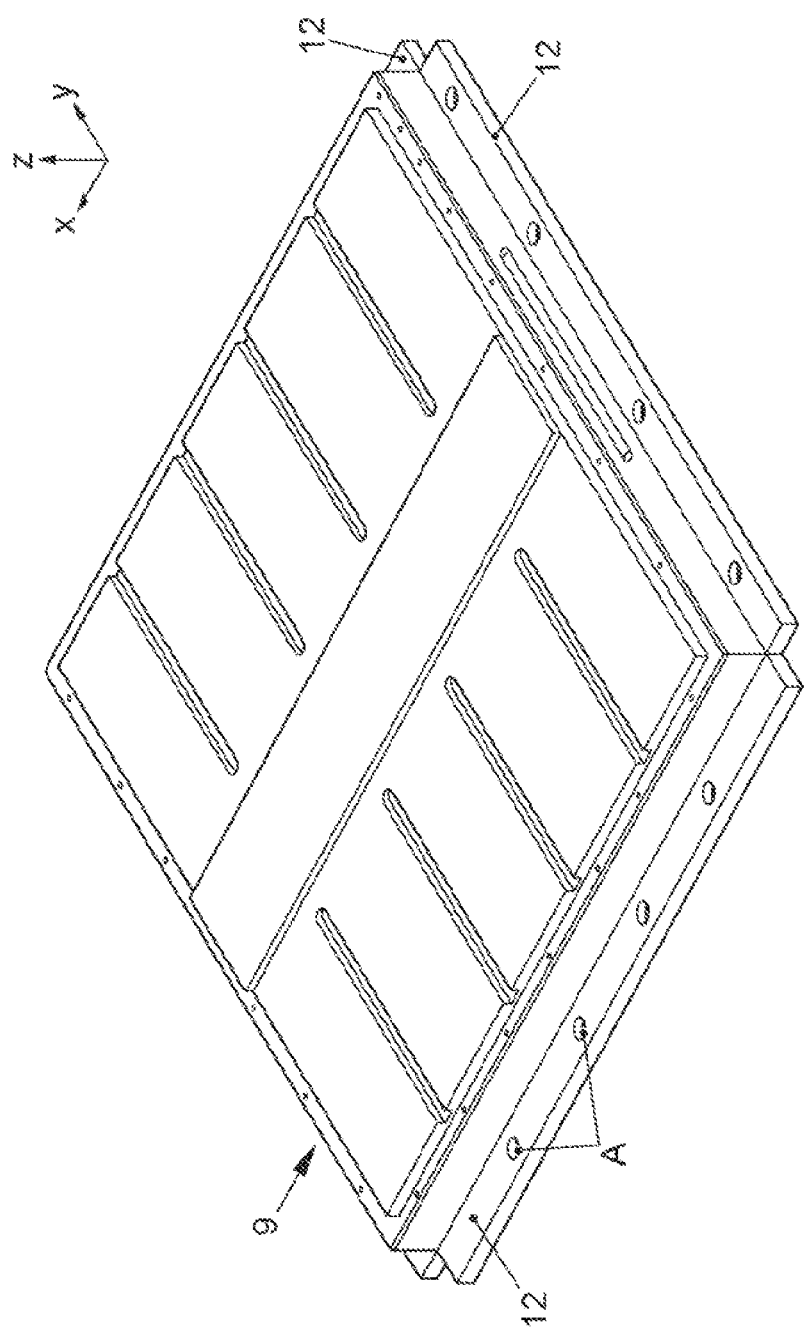
FIG. 2 shows a traction battery alone in a perspective view.
Figure 3:
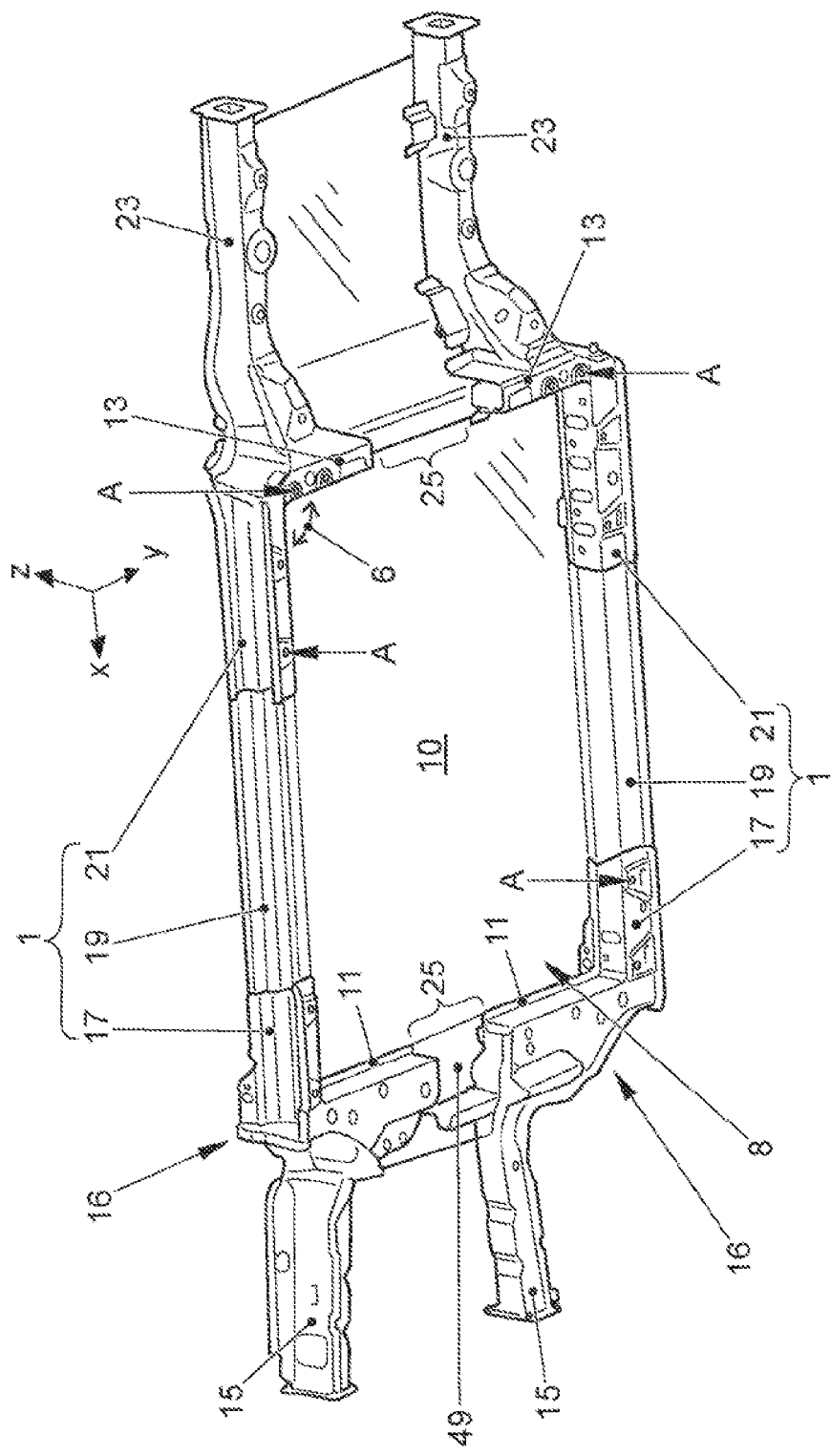
FIG. 3 shows an undercarriage of the body structure with traction battery removed, in a perspective view from below.

In FIG. 1, a body structure of a two-track vehicle is shown that is described below to the extent necessary for understanding the invention. Accordingly, the body structure has two lateral rocker panels 1 extending in the longitudinal vehicle direction x, of which only one is shown in FIG. 1. The rocker panel 1 extends in the longitudinal vehicle direction x between a front A-pillar 3 and a rear C-pillar 5, and delimits side-door openings 7 on the floor side. A crash-sensitive traction battery 9 (FIG. 2) is installed in the vehicle floor of the body structure. This battery is positioned beneath a floor pan part 10 (FIG. 3) in an installation space 8 (FIG. 3). The installation space 8 extends in the transverse vehicle direction y between the two rocker panels 1. In the longitudinal vehicle direction x, the installation space 8 extends between a front battery cross member 11 and a rear battery cross member 13. In FIG. 2, the traction battery 9 has a circumferential housing flange 12, which can be screwed to the underside of the rocker panels 1 as well as the battery cross members 11, 13 via screw points A.

As is evident from FIG. 3, a front body longitudinal member 15 that transitions into the respective rocker panel 1 toward the rear of the vehicle in the longitudinal vehicle direction x, with the interposition of a hollow profile corner joint 16, extends on each vehicle side in the front-end region of the body structure.

In FIG. 3, the rocker panel 1 is constructed in multiple parts in the longitudinal vehicle direction x, namely with a front connecting element 17, a center section 19, and a rear connecting element 21, which is adjoined by a rear body longitudinal member 23. Moreover, only an inner part of the rocker panel 1 is shown in the figures, while an outer rocker panel part is omitted. In FIG. 3, the front and rear battery cross members 11, 13 are not designed to be completely continuous in the transverse vehicle direction y, but rather are interrupted in the vehicle center with a supply access 25, through which supply lines can be installed.

Figure 4:
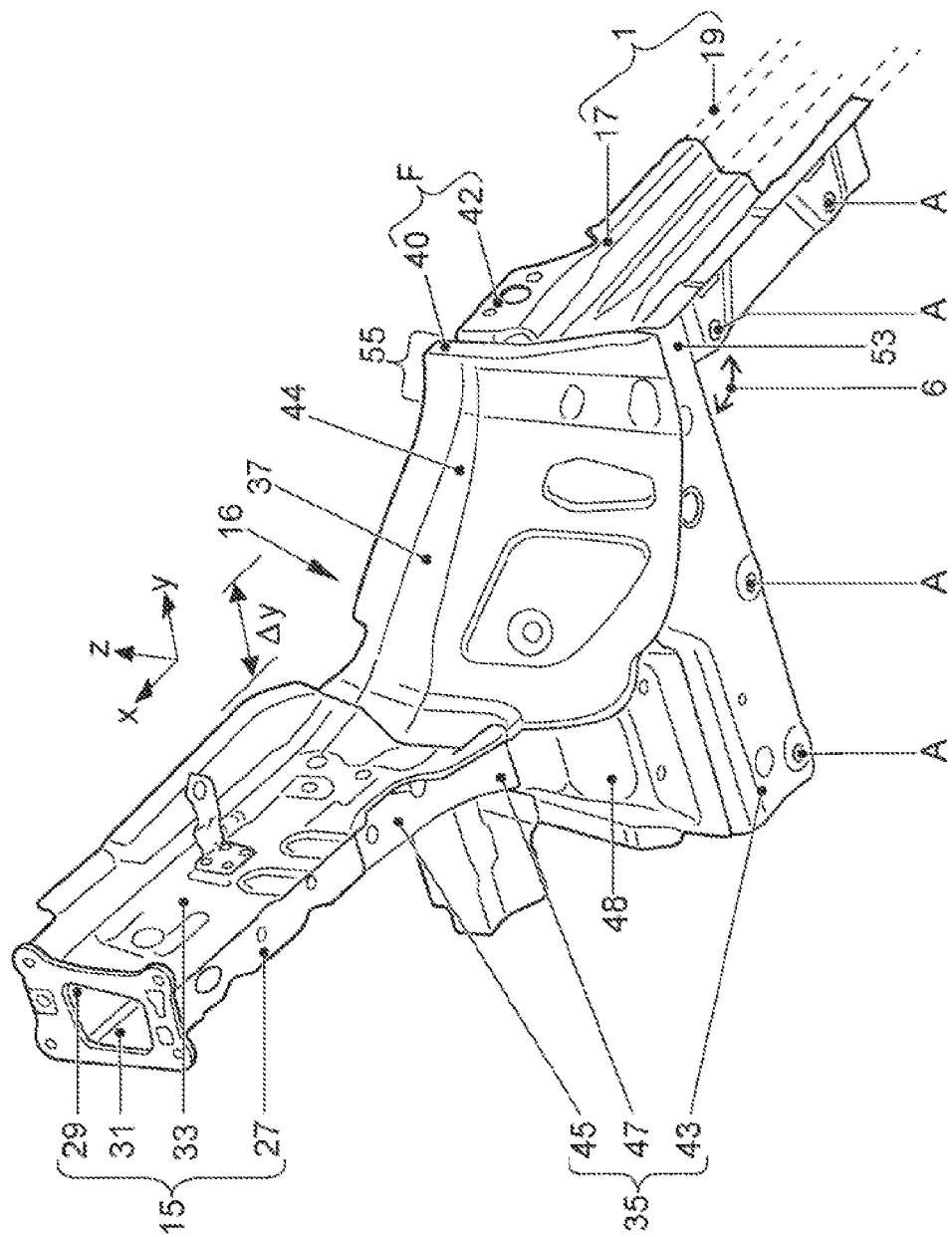
FIGS. 4 to 7 show various different views of the hollow profile corner joint.
Figure 5:
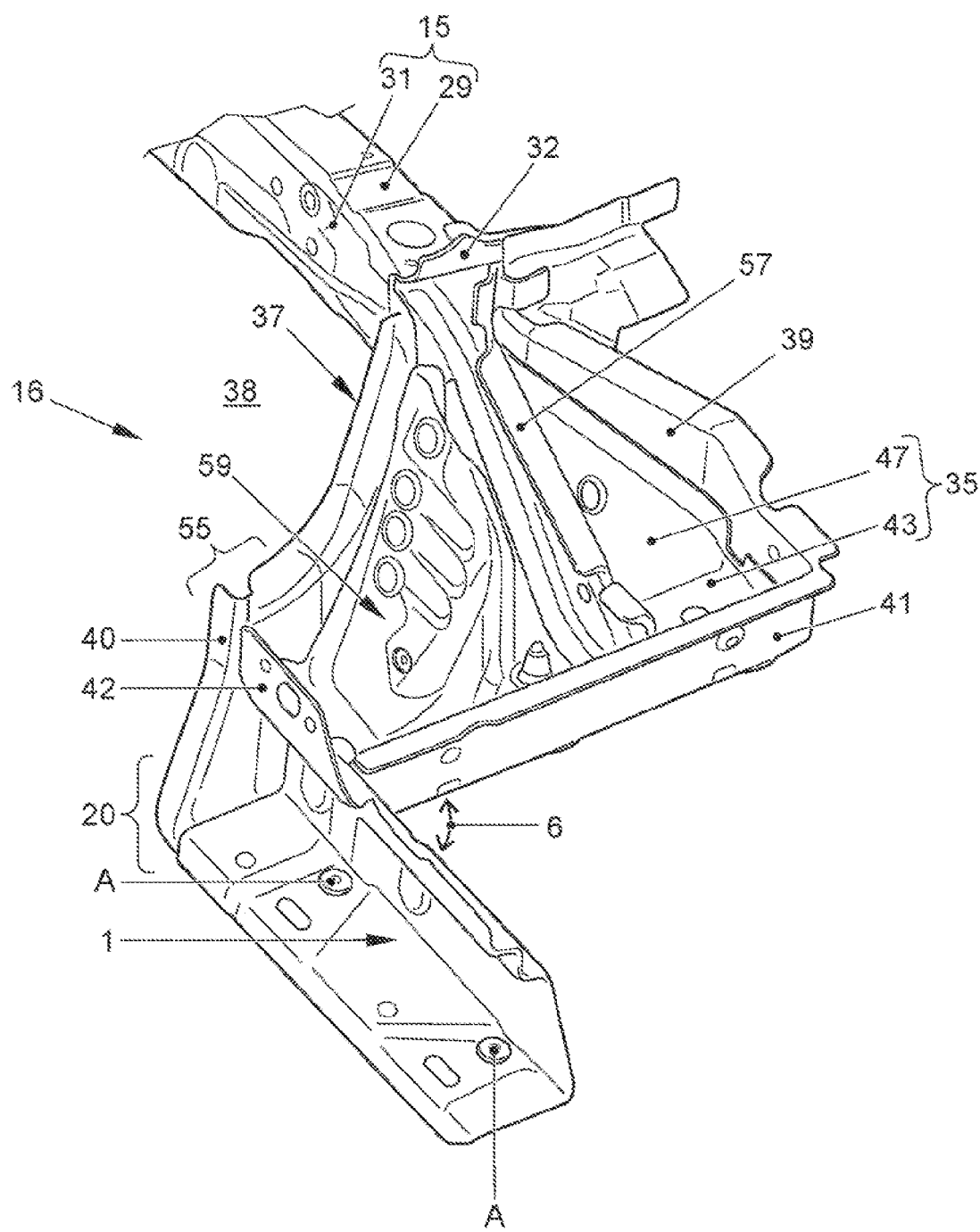
Figure 7:
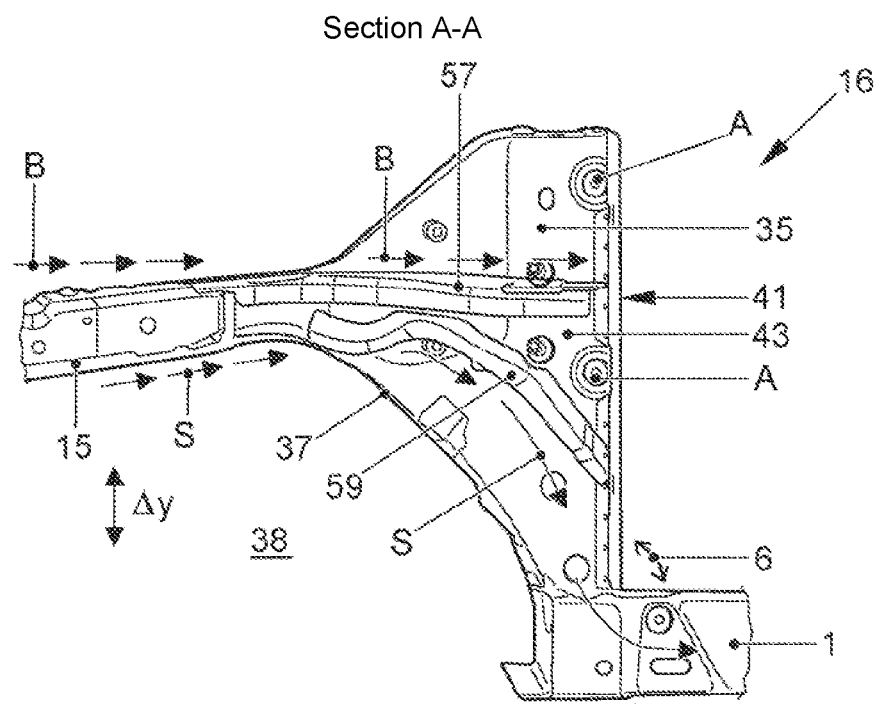

With regard to an enlargement of the installation space for the traction battery, the rocker panel 1 on each side of the vehicle is offset toward the exterior of the vehicle with respect to the front body longitudinal member 15 by a lateral offset $\Delta y$ in the transverse vehicle direction y (FIGS. 4 and 7). In order to nevertheless obtain a force-transmitting connection between the front body longitudinal member 15 and the rocker panel 1 in the event of a frontal crash, the lateral offset $\Delta y$ is bridged by means of the interposed hollow profile corner joint 16; the hollow profile corner joint 16 widens from the front body longitudinal member 15 toward the rear of the vehicle in the transverse vehicle direction y, taking up the lateral offset $\Delta y$. In this way, a rigid, force-transmitting connection of the front body longitudinal member 15 to the rocker panel 1 is achieved in the rocker panel connecting point 20 (FIG. 5).

As is evident from FIG. 1 or 4, for example, the front body longitudinal member 15 is a hollow profile part that is closed in cross-section with a longitudinal member floor 27, a longitudinal member top wall 29, as well as an inner side wall 31 and an outer side wall 33, which connect the longitudinal member floor 27 to the longitudinal member top wall 29.

In the same manner, the hollow profile corner joint 16 is also realized as a hollow profile part that is closed in cross-section. Its corner joint floor 35 lengthens the longitudinal member floor 27 toward the rear of the vehicle. Similarly, the corner joint side walls 37, 39 lengthen the longitudinal member side walls 31, 33 toward the rear of the vehicle. In addition, a corner joint top wall 36 likewise lengthens the longitudinal member top wall 29 toward the rear of the vehicle. The cavity of the hollow profile corner joint 16 thus formed is closed toward the rear of the vehicle by a transverse partition part 41 (FIG. 5, for example) of the front battery cross member 11. The transverse partition part 41 delimits the battery installation space 8 and, together with the rocker panel 1, spans an interior corner region 6 that encloses a corner of the battery.

Figure 10:
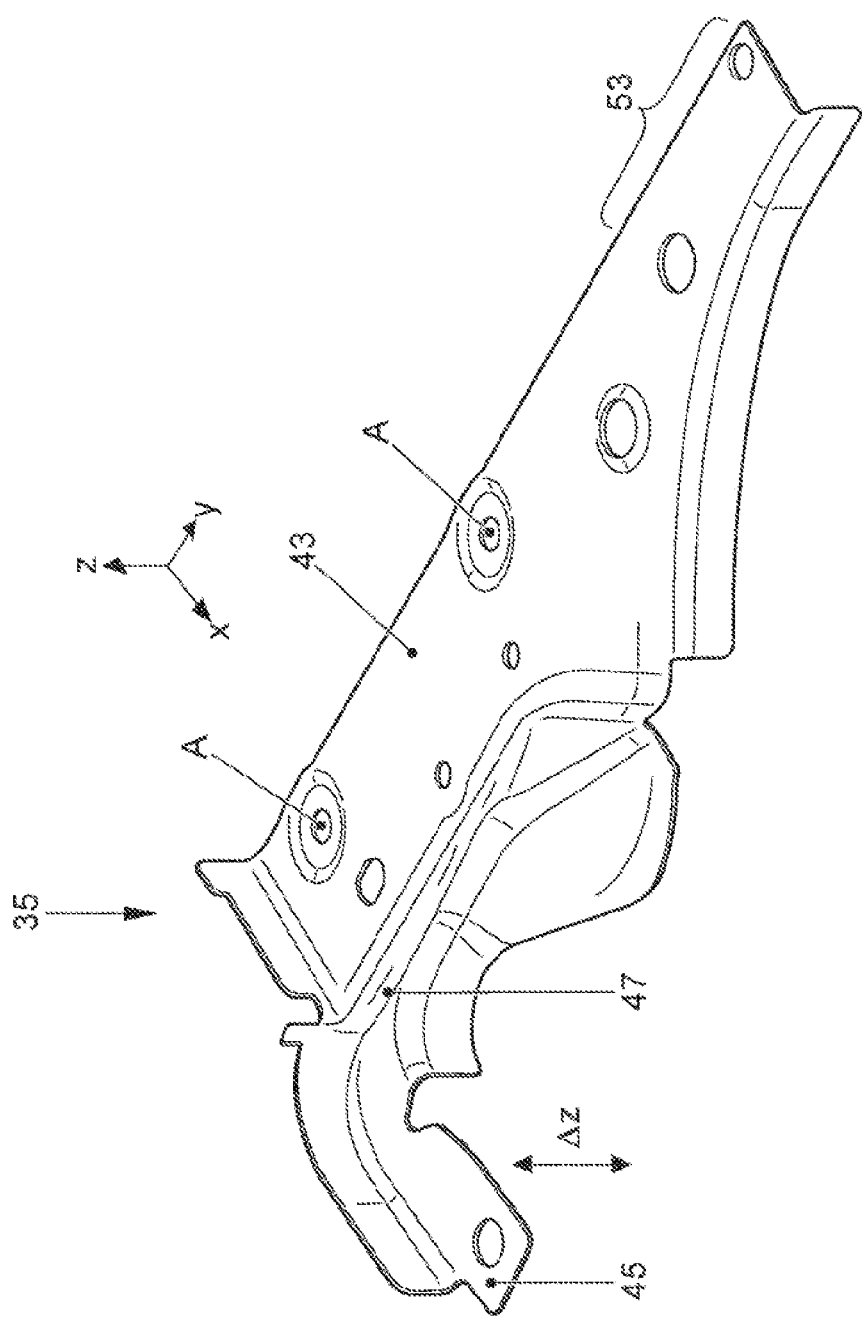
FIG. 10 shows a corner joint floor alone.
Figure 11:
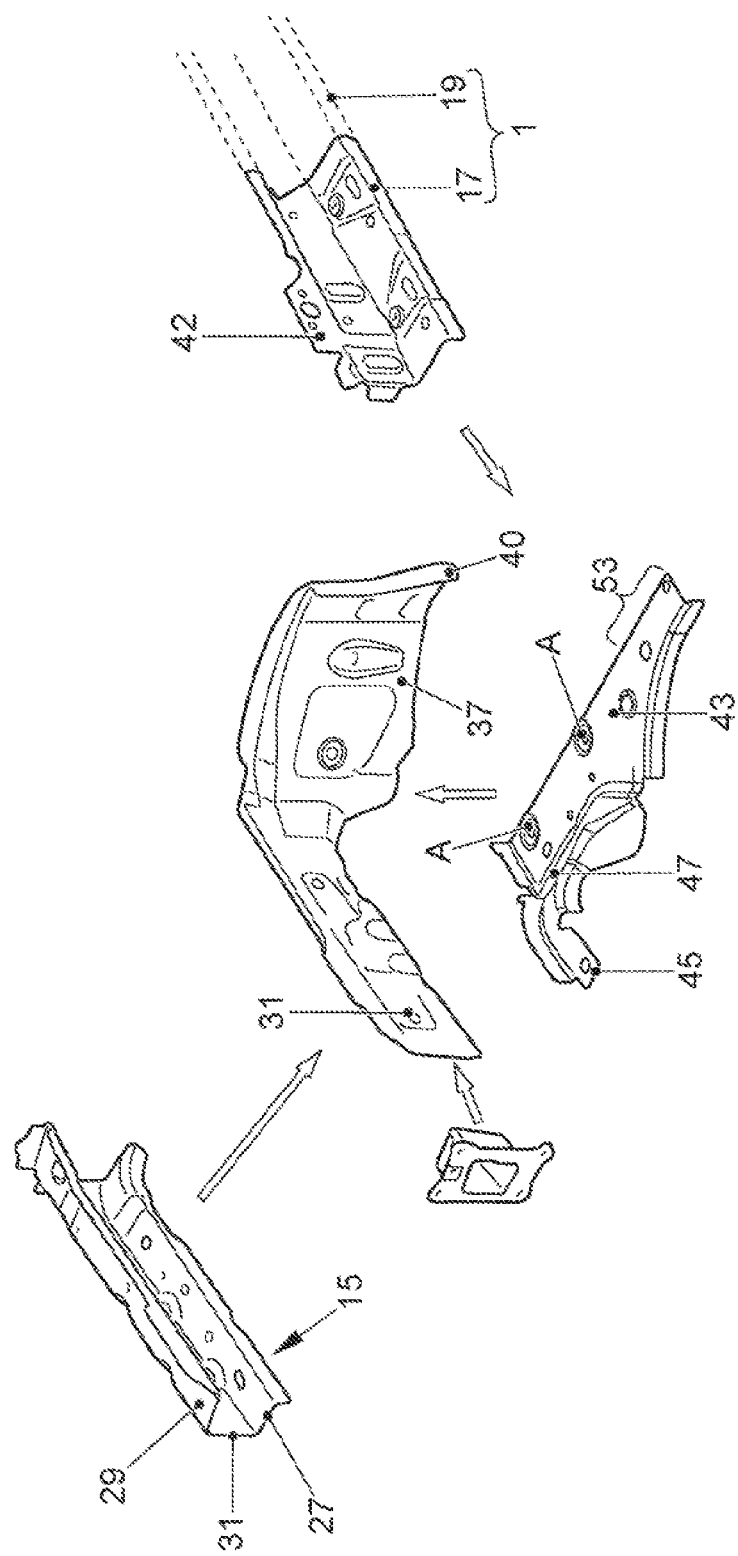
FIG. 11 shows components of the corner joint in an exploded view.

According to FIG. 4 or 10, the corner joint floor 35 is divided into a vehicle rear/lower floor segment 43 and a vehicle front/upper floor segment 45. The vehicle rear/lower floor segment 43 extends horizontally and in a planar fashion, and has screw points A for attachment to the traction battery 9. The vehicle front/upper floor segment 45 of the corner joint floor 35 is attached to the longitudinal member floor 27 (for example by welding) in the assembled state. In FIG. 10, the two floor segments 43, 45 of the corner joint floor 35 are offset vertically relative to one another by a vertical offset Δz and transition into one another at an inclined center segment 47.

Figure 6:
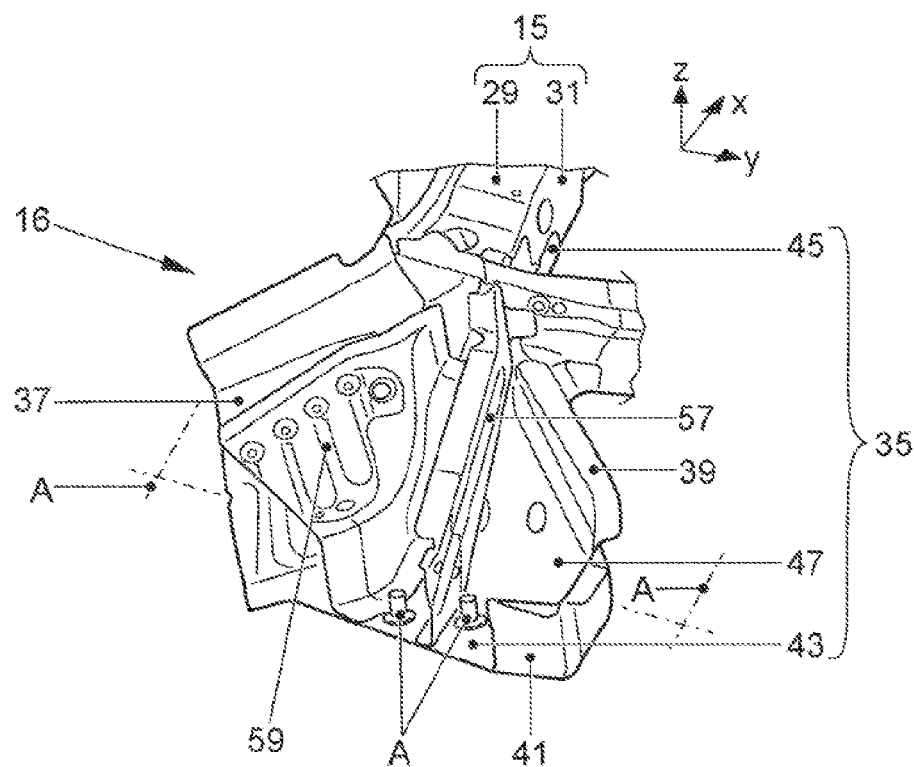
Figure 8:
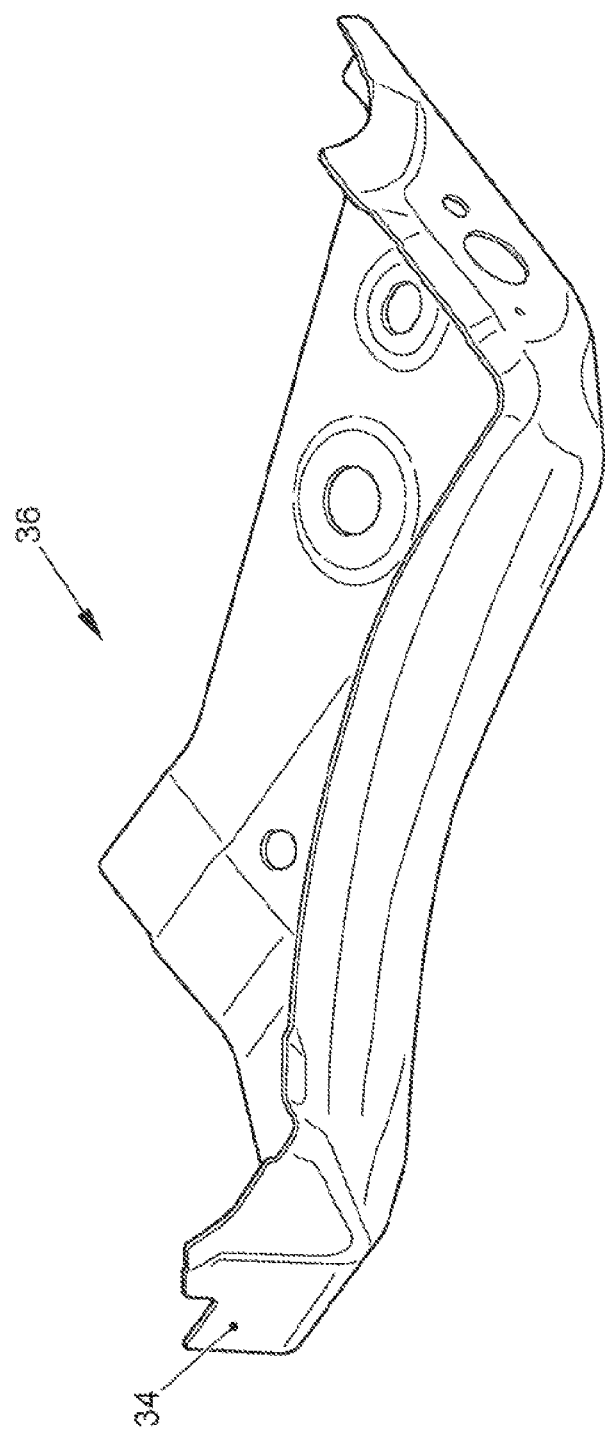
FIG. 8 shows a corner joint top wall alone.
Figure 9:
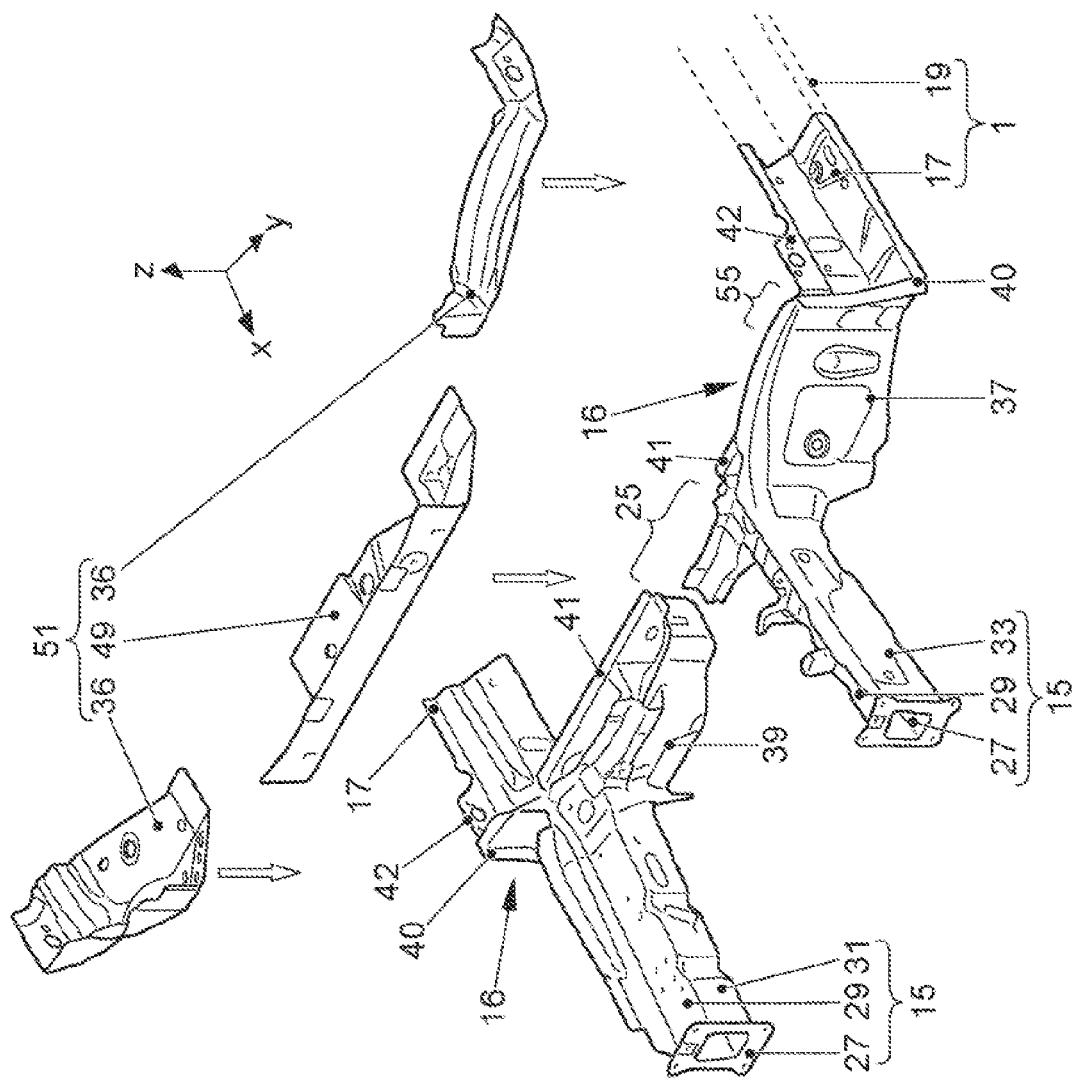
FIG. 9 shows the undercarriage of the body structure in the front-end region in an exploded view.

In FIGS. 5 to 7, the hollow profile corner joint 16 is shown without corner joint top wall 36. This top wall is shown alone in FIG. 8, and is shown in FIG. 9 as part of an exploded view. In FIG. 9, the two corner joint top walls 36, together with a center panel 49, are part of a footwell cross member panel 51. The footwell cross member panel 51 delimits a passenger compartment footwell toward the front of the vehicle. In the assembled state, the footwell cross member panel 51 extends continuously across the entire width of the vehicle. In this way, the center panel 49 (FIG. 3 or 9) of the footwell cross member panel 51 bridges the window-like supply access 25 at the top, while the supply access 25 remains open toward the vehicle bottom. According to FIG. 8, the corner joint top wall has, at its end toward the vehicle front, a joining flange 34, which is welded to a corresponding joining flange 32 (FIG. 5) of the longitudinal member top wall 29 in the assembled state.

As is further evident from FIG. 5, the corner joint outer side wall 37 as well as the rocker panel 1 have edge flanges 40, 42. The edge flanges 40, 42 lie in a common vertical joint plane, which represents a platform border. The outer rocker panel part can be connected to the two edge flanges 40, 42.

A design of the rocker panel connecting point 20 (FIG. 5) that is rigid in the event of a frontal crash is of particular importance. To achieve the rocker panel connecting point 20, the vehicle rear/lower floor segment 43 of the corner joint floor 35 is lengthened toward the exterior of the vehicle in the transverse vehicle direction y with a joining section 53 (FIG. 4 or 10). The joining section 53 of the corner joint floor 35 engages under the rocker panel underside and is connected to it in a force-transmitting manner (through a weld joint, for example). In addition, the corner joint outer side wall 37 is lengthened toward the exterior of the vehicle in the transverse vehicle direction y at a transition edge 44 (FIG. 4) with a rocker panel end piece 55. In FIG. 4 or 5, the rocker panel 1 terminates toward the front of the vehicle in a force-transmitting manner directly at the rocker panel end piece 55 of the corner joint outer side wall 37.

In the event of a frontal crash, a battery load path B is formed according to FIG. 7. The front body longitudinal member 15, the corner joint floor 35 acting as a shear panel, and the transverse partition part 41 of the front battery cross member 11 are incorporated into the battery load path B. In order to reinforce the battery load path B, a partition part 57 is provided in the cavity of the hollow profile corner joint 16. The partition part 57 extends in longitudinal alignment with the front longitudinal member 15. Moreover, the partition part 57 is connected to the corner joint floor 36 as well as to the corner joint top wall 36 via weld points.

In addition, a rocker panel load path S (FIG. 7) is formed in the event of a frontal crash. The front body longitudinal member 15, the corner joint floor 35 acting as a shear panel, the corner joint outer side wall 37, and the rocker panel 1 are incorporated into the rocker panel load path S. In order to reinforce the rocker panel load path S, a reinforcing panel 59 is arranged in the cavity of the hollow profile corner joint 16. The reinforcing panel 59 is connected to the corner joint floor 35, to the transverse partition part 41 of the front battery cross member 11, and also to the corner joint outer side wall 37 in a force-transmitting manner via weld points while forming a hollow member.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A body structure for an electrically operated vehicle, the body structure comprising:
   an installation space for a traction battery, the installation space being open towards a vehicle bottom in a vertical vehicle direction and is delimited toward the vehicle top by a floor pan part that forms a vehicle floor and is delimited on both sides in a transverse vehicle direction by a rocker panel that delimits a side-door opening towards the vehicle bottom;
   a front body longitudinal member, that transitions into a respective rocker panel toward a rear of the vehicle in a longitudinal vehicle direction, extends on each vehicle side in a front-end region,
   wherein a front corner of the traction battery is enclosed by an interior corner region that stretches between the rocker panel and pep front battery cross member,
   wherein the rocker panel on each side of the vehicle is offset toward an exterior of the vehicle with respect to the front body longitudinal member by a lateral offset in the transverse vehicle direction,
   wherein a corner joint produced as a hollow profile adjoins the front body longitudinal member toward the rear of the vehicle in the longitudinal vehicle direction, the corner joint is widened toward the rear of the vehicle in the longitudinal vehicle direction taking up the lateral offset, and the corner joint is connected to the rocker panel in a force-transmitting manner at a rocker panel connecting point,
   wherein the front body longitudinal member is a hollow profile part that is closed in cross-section, having a longitudinal member floor, a longitudinal member top wall, and having longitudinal member inner and outer side walls that connect the longitudinal member floor to the longitudinal member top wall, and wherein the corner joint is a hollow profile part that is closed in cross-section, a corner joint floor of the corner joint lengthens the longitudinal member floor toward the rear of the vehicle, corner joint inner and outer side walls of the corner joint lengthen the longitudinal member inner and outer side walls toward the rear of the vehicle, and a corner joint top wall of the corner joint lengthens the longitudinal member top wall toward the rear of the vehicle, and wherein a cavity of the corner joint is closed toward the rear of the vehicle by a transverse partition part of the front battery cross member.

2. The body structure according to claim 1, wherein the corner joint floor is divided into a vehicle rear and lower floor segment, that is a horizontally planar floor segment, for attachment of the traction battery, and a vehicle front and upper floor segment, that is a horizontally planar floor segment, for attachment to the longitudinal member floor, and wherein the vehicle rear and lower floor segment and the vehicle front and upper floor segment are offset vertically relative to one another by a vertical offset and/or transition into one another at a center segment.

3. The body structure according to claim 1, wherein the corner joint on each side of the vehicle are designed as mirror images with respect to a vehicle longitudinal center plane and/or are separated from one another in the transverse vehicle direction by a window-like supply access.

4. The body structure according to claim 3, wherein the corner joint top wall is part of a footwell cross member panel that delimits a passenger compartment footwell toward the front of the vehicle.

5. A body structure for an electrically operated vehicle, the body structure comprising:
    an installation space for a traction battery, the installation space being open towards a vehicle bottom in a vertical vehicle direction and is delimited toward the vehicle top by a floor pan part that forms a vehicle floor and is delimited on both sides in a transverse vehicle direction by a rocker panel that delimits a side-door opening towards the vehicle bottom;
    a front body longitudinal member, that transitions into a respective rocker panel toward a rear of the vehicle in a longitudinal vehicle direction, extends on each vehicle side in a front-end region,
    wherein a front corner of the traction battery is enclosed by an interior corner region that stretches between the rocker panel and a front battery cross member,
    wherein the rocker panel on each side of the vehicle is offset toward an exterior of the vehicle with respect to the front body longitudinal member by a lateral offset in the transverse vehicle direction,
    wherein a corner joint produced as a hollow profile adjoins the front body longitudinal member toward the rear of the vehicle in the longitudinal vehicle direction, the corner joint is widened toward the rear of the vehicle in the longitudinal vehicle direction taking up the lateral offset, and the corner joint is connected to the rocker panel in a force-transmitting manner at a rocker panel connecting point,
    wherein the corner joint on each side of the vehicle are designed as mirror images with respect to a vehicle longitudinal center plane and/or are separated from one another in the transverse vehicle direction by a window-like supply access,
    wherein the corner joint top wall is part of a footwell cross member panel that delimits a passenger compartment footwell toward the front of the vehicle, and
    wherein the footwell cross member panel extends continuously across the entire width of the vehicle, and wherein the footwell cross member panel bridges the window-like supply access at the top, such that the supply access is open toward the vehicle bottom.

6. The body structure according to claim 1, wherein, in the event of a frontal crash, a battery load path is formed that incorporates the front body longitudinal member, the corner joint floor acting as a shear panel, and the transverse partition part of the front battery cross member, and wherein, in order to reinforce the battery load path, a partition part is provided in the cavity of the corner joint, and wherein the partition part extends in longitudinal alignment with the front body longitudinal member and/or is connected to the corner joint floor as well as to the corner joint top wall via attachment points.

7. The body structure according to claim 1, wherein, in the event of a frontal crash, a rocker panel load path is formed that incorporates the front body longitudinal member, the corner joint floor acting as a shear panel, the corner joint outer side wall, and the rocker panel, and wherein, in order to reinforce the rocker panel load path, a reinforcing panel is arranged in the cavity of the corner joint, and wherein the reinforcing panel is connected to the corner joint floor, to the transverse partition part of the front battery cross member and to the corner joint outer side wall in a force-transmitting manner while forming a hollow member, and wherein the reinforcing panel is free of connection relative to the corner joint top wall.

8. The body structure according to claim 2, wherein the vehicle rear and lower floor segment of the corner joint floor is lengthened toward the exterior of the vehicle in the transverse vehicle direction with a joining section that engages under the rocker panel and is connected to the rocker panel in a force-transmitting manner.

9. The body structure according to claim 1, wherein the corner joint outer side wall delimits a wheel space of a front wheel well toward the interior of the vehicle in the transverse vehicle direction, and wherein, the corner joint outer side wall transitions toward the rear of the vehicle, at a transition edge, into a rocker panel end piece that delimits the wheel space toward the rear of the vehicle, and wherein the rocker panel terminates toward the front of the vehicle at the rocker panel end piece.

10. The body structure according to claim 1, wherein the interior corner region is a right-angled interior corner region.

* * * * *